United States Patent [19]

Dhein et al.

[11] Patent Number: 5,552,477

[45] Date of Patent: * Sep. 3, 1996

[54] COATING COMPOUND, A PROCESS FOR ITS PREPARATION AND ITS USE FOR THE PRODUCTION OF COATINGS

[75] Inventors: Rolf Dhein; Knud Reuter, both of Krefeld; Lothar Bäcker, Dormagen; Manfred Bock, Leverkusen; Werner Kubitza, Leverkusen; Joachim Probst, Leverkusen, all of Germany

[73] Assignee: Bayer Aktiengesellschaft, Leverkusen, Germany

[ * ] Notice: The portion of the term of this patent subsequent to May 3, 2011, has been disclaimed.

[21] Appl. No.: 204,183

[22] PCT Filed: Aug. 28, 1992

[86] PCT No.: PCT/EP92/01983

§ 371 Date: Mar. 4, 1994

§ 102(e) Date: Mar. 4, 1994

[87] PCT Pub. No.: WO93/05087

PCT Pub. Date: Mar. 18, 1993

[30] Foreign Application Priority Data

Sep. 10, 1991 [DE] Germany .......................... 41 29 951.5

[51] Int. Cl.$^6$ .......................... C08L 75/04; C08L 75/06; C08G 18/42

[52] U.S. Cl. .......................... 524/840; 524/591; 524/839; 528/71

[58] Field of Search .......................... 524/591, 839, 524/840; 528/71

[56] References Cited

U.S. PATENT DOCUMENTS

| 3,477,977 | 11/1969 | Schnell et al. | 106/252 |
|---|---|---|---|
| 4,007,151 | 2/1977 | Ogawa et al. | 528/44 |
| 4,031,052 | 6/1977 | Dhein et al. | 428/458 |
| 4,171,294 | 10/1979 | Dhein | 524/539 |
| 4,276,210 | 6/1981 | Höhlein et al. | 524/512 |
| 4,594,385 | 6/1986 | Thoma et al. | 524/840 |
| 4,609,572 | 9/1986 | Gruber et al. | 427/385.5 |
| 4,652,466 | 3/1987 | Thoma et al. | 524/840 |
| 4,659,780 | 4/1987 | Stamegna et al. | 525/131 |
| 4,801,644 | 1/1989 | Coogan | 524/839 |
| 4,861,826 | 8/1989 | Hummerich et al. | 524/840 |
| 4,871,798 | 10/1989 | Dormish et al. | 524/840 |
| 4,895,894 | 1/1990 | Ruetman et al. | 524/840 |
| 4,977,207 | 12/1990 | Hoefer et al. | 524/840 |
| 5,039,733 | 8/1991 | Dormish et al. | 524/591 |
| 5,075,370 | 12/1991 | Kubitza et al. | 524/591 |
| 5,194,487 | 3/1993 | Jacobs | 524/591 |
| 5,308,912 | 5/1994 | Margotte et al. | 524/507 |
| 5,336,711 | 8/1994 | Schneider et al. | 524/840 |
| 5,344,873 | 9/1994 | Blum | 524/591 |
| 5,387,642 | 2/1995 | Blum et al. | 524/840 |
| 5,459,197 | 10/1995 | Schwindt et al. | 524/591 |

FOREIGN PATENT DOCUMENTS

0462287 12/1991 European Pat. Off. .

*Primary Examiner*—James J. Seidleck
*Assistant Examiner*—Rabon Sergent
*Attorney, Agent, or Firm*—Joseph C. Gil; Thomas W. Roy

[57] ABSTRACT

An aqueous two-component coating agent whose binder consists essentially of a combination of a) a polyol component present dissolved and/or dispersed in water comprising a1) at least one water-dilutable polymerisation resin or polycondensation resin with a molecular weight Mn of over 500 possessing hydroxyl groups and a2) a reactive diluent consisting of at least one water-soluble compound with a molecular weight Mn of under 500 capable of reacting with isocyanate groups and b) a polyisocyanate component with a viscosity at 23° C. of from 50 to 10 000 mPa present emulsified in the aqueous solution or dispersion, a method for producing such coating agents wherein the said polyisocyanate component is emulsified in the said aqueous solution or dispersion with the optional incorporation of auxiliary substances and additives in the system prior to adding the polyisocyanate, and the use of the coating agents for the production of air-drying and/or heat-drying coatings.

5 Claims, No Drawings

COATING COMPOUND, A PROCESS FOR ITS PREPARATION AND ITS USE FOR THE PRODUCTION OF COATINGS

The present invention relates to a novel aqueous coating agent based on a polyol component present dissolved and/or dispersed in water, consisting of one high-molecular polymerization resin or polycondensation resin and a reactive diluent and a polyisocyanate component present emulsified in it, a method for producing such coating agents and their use for the production of coatings.

Aqueous lacquer systems are gaining increasingly in importance on economic and ecological grounds. The replacement of conventional lacquer systems is however proceeding more slowly than was initially expected.

There are numerous reasons for this. Thus aqueous dispersions frequently still have disadvantages with regard to processing when compared with lacquer systems dissolved in organic solvents. In aqueous solutions, however, there is the problem of adequate solubility in water on the one hand as well as the opposite effect derived from it of lower water resistance of the coatings compared with conventionally dissolved lacquer systems. Added to this there are processing problems which in many cases result from the high viscosity and anomalies of viscosity and which hitherto have been surmounted by using organic solubilising agents. The quantity of solubilising agent that can be used for this is limited, as otherwise the ecological purpose of aqueous systems is defeated.

For this reason there were used in melamine resin cross-linked binder systems reactive diluents that were already water-dilutable (U.S. Pat. Nos. 4,031,052, 4,171,294, 4,276,210 or DE-OS 2,446,760 or 2,847,532) which on one hand favourably influence the solubility of the polymer systems but on the other hand became incorporated into the coatings through melamine resin cross-linking. However the reactivity of many aqueous melamine resins is so low that in many cases the cross-linking temperatures required are so high that the reactive diluents can escape from the coatings prior to cross-linking.

Quite recently aqueous two-component polyurethane systems have become known (DE-OS 3,829,587) with a binder consisting of a polyacrylic resin present dissolved and/or dispersed in water combined with a polyisocyanate with free isocyanate groups present emulsified in this dispersion or solution. Here it concerns essentially solvent-free systems, which is already evident from the fact that the solvents which were used in the preparation of the polymer resins are removed prior to producing the aqueous preparation. The concomitant use of reactive diluents is not discussed in the reference cited above.

Surprisingly it was then found that the use of reactive diluents, i.e. of low-molecular, not easily volatilised, liquid compounds with groups capable of reacting with isocyanate groups of the kind described in more detail below in aqueous two-component polyurethane systems based on high-molecular polymerization resins or polycondensation resins possessing hydroxyl groups and polyisocyanates, with free isocyanate groups result in a considerable improvement in systems as regards the dilutability in water of the components of the binder and the properties of the lacquer coatings produced from the binding agents. These advantages need not be acquired at the expense of the ecological disadvantage of usual solvents, as the non-volatile reactive diluents are incorporated in the lacquer film when the coating agent is processed.

The present invention provides coating agents, whose binder consists essentially of a combination of a) a polyol Component present dissolved and/or dispersed in water and b) a polyisocyanate component with a viscosity at 23° C. of from 50 to 10,000 mPa.s present emulsified in the aqueous solution and/or dispersion of the polyol component a)

in quantities corresponding to an equivalent proportion of isocyanate groups of component b) to active hydrogen atoms of component a) of from 0.5: 1 to 5: 1, characterised in that component a) consists essentially of a combination of a1) a high-molecular polyol component consisting essentially of at least one water-dilutable polymerization resin or polycondensation resin with a molecular weight Mn of over 500 possessing hydroxyl groups with a2) 5 to 70% by weight, related to the weight of component a1), of a reactive diluent consisting of at least one water-soluble compound that is not distillable at normal pressure or that has a boiling point of at least 150° C. with a molecular weight Mn of under 500 and having at least one group capable of reacting with isocyanate groups.

The present invention also provides a method for producing such coating agents, characterised in that a polyisocyanate component b) with a viscosity at 23° C. of from 50 to 10,000 mPa.s consisting of at least one organic polyisocyanate is emulsified in an aqueous solution or dispersion of a high-molecular polyol component a1) consisting essentially of at least one water-dilutable polymerization resin or polycondensation resin with a molecular weight Mn of over 500 possessing hydroxyl groups which contains 5 to 70% by weight, related to the weight of component a1), of a reactive diluent a2) consisting of at least one water-soluble compound that is not distillable at normal pressure or that has a boiling point of at least 150° C. with a molecular weight Mn of under 500 and having at least one group capable of reacting with isocyanate groups, wherein the quantitative proportions of the individual components correspond to an equivalent proportion of isocyanate groups to groups capable of reacting with isocyanate groups of from 0.5: 1 to 5: 1, and wherein optionally concomitantly used auxiliary substances and additives are incorporated in the system prior to addition of the polyisocyanate.

The present invention also provides for the use of these coating agents for the production of coatings.

The high-molecular polyol component a1) consists essentially of water-dilutable, i.e. soluble or dispersible in water, polymerization resins or polycondensation resins with a molecular weight Mn of over 500 possessing hydroxyl groups, or a mixture of several of such resins. The dilutability in water of these resins is due to the presence of chemically bonded carboxylate and/or sulphonate groups whose hydrophilic action is optionally promoted through the simultaneous use of external emulsifiers. Suitable polymerization resins or condensation resins are in particular polyacrylic resins and optionally urethane-modified polyester resins including alkyd resins.

Polyacrylic resins suitable as component a1) or as part of component a1) are in particular hydroxyfunctional copolymerizates with a hydroxyl number in the range of from 15 to 200 mg KOH/g and an acid number in the range of from 5 to 250 mg KOH/g having moreover a content of chemically bonded carboxylate and/or sulphonate groups of in total 8 to 450 milliequivalents per 100 g of solid. Here the acid number refers both to the free, unneutralized acidic groups, in particular carboxyl groups and the neutralized acidic groups present, in particular carboxylate groups. The copolymerizates generally have a molecular weight Mn of from 500 to 50,000, preferably 1000 to 25,000, determined by the method of gel permeation chromatography using polystyrene as standard.

The copolymerizates concerned are preferably those such as

A 1 to 30, preferably 1 to 10% by weight of acrylic acid and/or methacrylic acid, B 0 to 50% by weight of methyl methacrylate, C 0 to 50% by weight of styrene, wherein the sum of B+C is 10 to 70% by weight, D 10 to 45% by weight of one or several $C_1$–$C_8$ alkylacrylates, 5 to 45% by weight of one or several monohydroxyfunctional alkylacrylates or alkyl methacrylates, F 0 to 15% by weight of other olefinic unsaturated monomers, wherein the sum of A to F is 100% by weight, wherein moreover 5 to 100% of the polymerized acidic groups present are present in a form neutralized with aliphatic amines or with ammonia, so that the content of anionic salt-like groups in the copolymerizates corresponds to the above data.

The unsaturated acids A and optionally F present in polymerized form are, as stated, at least partly neutralized, so that the resulting anionic groups ensure or at least facilitate the solubility or dispersibility in water of the copolymerizates. In the event that only low concentrations of salt-like groups are present, the solubility or dispersibility in water of the copolymerizates may be facilitated by the concomitant use of external emulsifiers. In any case the dilutability in water of the copolymerizates must be ensured, either as a dispersion or as a colloid-disperse or molecular-disperse "solution".

The monomers B and C may be varied in such a way that the sum of B+C. contains from 10 to 70% by weight of one of the monomers exclusively, wherein methyl methacrylate is preferred; however the use of both methyl methacrylate and styrene together is particularly preferred.

Examples of suitable $C_1$–$C_8$ alkyl acrylates are methyl acrylate, ethyl acrylate, n-propyl acrylate, isopropyl acrylate, n-butyl acrylate, isobutyl acrylate, n-hexyl acrylate, n-octyl acrylate and 2-ethylhexyl acrylate. Preferred acrylates are n-butyl acrylate, n-hexyl acrylate, 2-ethylhexyl acrylate, particularly n-butyl and/or n-hexyl acrylate.

Examples of suitable hydroxyfunctional (meth)acrylates E are hydroxyethyl (meth)acrylate, hydroxypropyl (meth)acrylate (through addition of propylene oxide to a mixture of isomers containing (meth)acrylic acid), 4-hydroxybutyl (meth)acrylate or any mixtures of these monomers. 2-hydroxyethyl methacrylate and the aforesaid hydroxypropyl methacrylate isomer mixture are preferred.

The other monomer components F may be substituted styrene derivatives such as, for example, the isomeric vinyltoluene, α-methylstyrene, propenylbenzene, $C_5$–$C_{12}$ cycloalkyl (meth)acrylate, vinyl esters such as vinyl acetate, vinyl propionate or vinyl versatate and vinylsulphonic acid, wherein the total quantity of polymerisable acids (carboxylic acid A plus optionally the acids listed under F) does not exceed 30% by weight.

For the neutralization, completely or in part, of the polymerized acidic groups present, aliphatic amines are suitable such as, for example, triethylamine, 2-amino-2-methylpropanol (1), dimethylethanolamine, diethylethanolamine or any other aliphatic amines, preferably with a molecular weight in the range of 31 to 200.

As already indicated above, the term "polycondensation resin" may comprise in particular (i) polyester resins free of fatty acids and oils, (ii) fatty acid-modified or oil-modified polyester resins, so-called "alkyd resins" and (iii) urethane-modified derivatives of the resins (i) and (ii).

Polycondensation resins suitable as component a1) or as part of component a1) are in particular those with a molecular weight Mn in the range of over 500 up to 10,000, wherein molecular weights of up to 5000 are in this case determined in dioxane and acetone by steam pressure osmometry with the inferior value being taken as correct where values differ, and wherein molecular weights of over 5000 are determined in acetone by membrane osmometry. The polycondensation resins generally show hydroxyl numbers of from 30 to 300, preferably of from 50 to 200 mg KOH/g and acid numbers (according to the definition given above) of from 25 to 70, preferably 35 to 55 mg KOH/g. In accordance with the statements made above, the carboxyl groups incorporated are converted into carboxylate groups by neutralization with amines or ammonia in a quantity of from 30 to 200, preferably 50 to 150 milliequivalents per 100 g of solid, wherein this may be a partial or complete neutralization of the incorporated carboxyl groups, however an excess of amine or $NH_3$ may be used even within the limits of the given quantity range.

The preparation of the polyester resin or alkyd resin takes place according to a known method by polycondensation of alcohols and carboxylic acids such as are defined, for example, in Römpp's Chemielexikon, Volume 1, page 202, Frankh'sche Verlagsbuchhandlung, Stuttgart, 1966, or are described in: D. H. Solomon, The Chemistry of Organic Film Formers, pages 75–101, John Wiley & Sons Inc., New York, 1967.

Starting materials for preparing polycondensation resins are, for example 1- to 6- preferably 1- to 4-valent alcohols with molecular weights in the range 32 to 500 such as ethylene glycol, propylene glycol, butanediol, neopentyl glycol, 2-ethylpropanediol-1,3, hexanediol, ether alcohols such as di- and triethylene glycol, oxyethylated bisphenols; perhydrogenated bisphenols, also trimethylolethane, trimethylolpropane, glycerol, pentaerythritol, dipentaerythritol, mannitol and sorbitol, monovalent chain-breaking alcohols such as methanol, propanol, butanol, cyclohexanol and benzyl alcohol;

polyvalent carboxylic acids or carboxylic anhydrides with a molecular weight in the range of from 100 to 300 such as phthalic acid, phthalic anhydride, isophthalic acid, terephthalic acid, tetrahydrophthalic acid, hexahydrophthalic acid, trimellitic anhydride, pyrromellitic anhydride, maleic anhydride, adipic acid or succinic anhydride;

aromatic or saturated aliphatic monocarboxylic acids such as, for example, benzoic acid, hexahydrobenzoic acid, butylbenzoic acid, coconut fatty acid or α-ethylhexanoic acid;

olefinic unsaturated fatty acids and derivatives of olefinic unsaturated fatty acids such as, for example, linseed fatty acid, soybean oil fatty acid, wood oil fatty acid, safflower oil fatty acid, dehydrated castor oil fatty acid, cotton seed oil fatty acid, arachis oil fatty acid or tall oil fatty acid; synthetic, olefinic unsaturated $C_{12}$–$C_{22}$ fatty acids as well as derivatives obtained through conjugation, isomerisation or dimerisation of such unsaturated fatty acids;

the oils corresponding to the aforementioned natural fatty acids, i.e. linseed oil, soya oil, wood oil, safflower oil, dehydrated castor oil, cotton seed oil, arachis oil, tall-oil or even castor oil;

mono- to trifunctional isocyanates with a molecular weight in the range 119 to 350 such as, for example, phenyl isocyanate, stearyl isocyanate, cyclohexyl isocyanate, toluylene diisocyanate-2,4 and -2,6, diphenylmethane-4,4'-diisocyanate, naphthylene-1,5-diisocyanate, 3,3'-dichloro-4,4'-bisphenylene diisocyanate, hexamethylene diisocyanate and triphenylmethane-4, 4'-4"-triisocyanate.

When preparing polyesters free of fatty acids and oils, the monovalent alcohols and in particular polyvalent alcohols given as examples are reacted in a manner known per se with the polybasic acids given as examples.

The alkyd resins containing fatty or oily acids are prepared in a manner known per se from polyols of the kind given as examples and from dicarboxylic acids or their anhydrides of the kind given as examples with the concomitant use of non-drying, half-drying or drying oils of the kind given as examples or their transesterification products with polyvalent alcohols of the kind given as examples. Fatty acids or oily acids from natural oils, or synthetic fatty acids or fatty acids obtainable from natural fatty or oily acids by hydrogenation, dehydration or dimerisation may also be used instead of the oils or their transesterification products.

The polyols used for the preparation of the alkyd resins are preferably at least trivalent alcohols such as glycerol or trimethylolpropane. Tetravalent alcohols and alcohols of higher valency, such as pentaerythritol, dipentaerythritol or sorbitol or mixtures of them with the aforesaid polyols are particularly suitable for preparing water-dilutable resins, as high hydroxyl numbers of the alkyd resins promote the dilutability in water. Divalent alcohols such as ethylene glycol, diethylene glycol, butanediol or neopentyl glycol may be used concomitantly.

Acids or acid anhydrides particularly suitable for preparing alkyd resins are adipic acid, isophthalic acid, phthalic acid and, most preferably, phthalic anhydride.

The preparation of urethane-modified polyester resins takes place in a manner known per se through the use of isocyanates following the polycondensation reaction.

The required hydroxyl group content is ensured in a manner known per se through a suitable selection of the kind and quantitative proportions of the initial components within the limits of the disclosure.

The carboxyl groups necessary to attain the dilutability in water may be introduced, for example, by forming half esters from a previously prepared polyester resin containing hydroxyl groups with acid anhydrides of the aforesaid kind. Tetramethylphthalic anhydride is particularly suitable for this half-ester formation. The introduction of carboxyl groups may also take place, for example, through the use in the polycondensation reaction of dimethylolpropionic acid, whose free carboxyl groups generally do not take part in the polycondensation reaction owing to steric hindrance, so that the incorporation of this acid occurs exclusively through the hydroxyl groups.

The polyol component a2), i.e. the reactive diluent, consists of at least one water-soluble compound which for the purpose of the isocyanate addition reaction is at least monofunctional, preferably difunctional to tetrafunctional, is not distillable at normal pressure or has a boiling point of at least 150° C., with a molecular weight Mn of under 500, preferably under 300.

Monofunctional compounds such as, for example, n-hexanol, n-butoxyethanol, n-octanol or even amides such as, for example, ε-caprolactam are suitable for the purpose of the isocyanate addition reaction. However, the compounds of component a2) are preferably water-soluble, at least divalent, in particular divalent to tetravalent alcohols with a molecular weight of under 500, in particular under 300, such as, for example, ethylene glycol, propylene glycol, the isomeric butanediols, pentanediols, hexanediols, octanediols; the polyethylene glycols or polypropylene glycols corresponding to the given specifications as regards molecular weight i.e. glycerol, trimethylolpropane, pentaerythritol, sorbitol, mannitol, or the ethoxylation or propoxylation products of these high-functional alcohols, if these products correspond to the given specifications as regards molecular weight.

Any mixtures of the compounds given as examples may of course also be used.

Component a2) is present in the coating agents according to the present invention in a quantity of from 5 to 70, preferably 20 to 50% by weight, related to the weight of component a1).

The polyisocyanate component b) may be any organic polyisocyanate with aliphatically, cycloaliphatically, araliphatically and/or aromatically bonded, free isocyanate groups that are liquid at room temperature. The polyisocyanate component b) generally has a viscosity of from 50 to 10,000, preferably 50 to 1000 mPa.s at 23° C. Polyisocyanate mixtures with exclusively aliphatically and/or cycloaliphatically bonded isocyanate groups having an NCO-functionality (average) of between 2.2 and 5.0 and a viscosity at 23° C. of from 50 to 500 mPa.s are particularly preferred.

The so-called "lacquer polyisocyanates" with aromatically or (cyclo)aliphatically bonded isocyanate groups are particularly suitable as component b), with the aforesaid aliphatic isocyanates, as already stated, being particularly preferred. For example, "lacquer polyisocyanates" based on hexamethylene diisocyanate or on 1-isocyanato-3,3,5-trimethyl-5-isocyanatomethylcyclohexane (IPDI) and/or bis(isocyanatocyclohexyl)-methane, in particular those based exclusively on hexamethylene diisocyanate, are very suitable. "Lacquer polyisocyanates" based on these diisocyanates are understood to include the derivatives of these diisocyanates known per se possessing biuret groups, urethane groups, uretdione groups and/or isocyanurate groups which, following their preparation in a known manner, have been liberated preferably by distillation of excess initial diisocyanate until a residue of less than 0.5% by weight remains. Among the preferred aliphatic polyisocyanates to be used according to the present invention are the hexamethylene diisocyanate-based polyisocyanates fulfilling the aforesaid criteria and possessing biuret groups such as may be obtained, for example, by the methods disclosed in the U.S. Pat. 3,124,605, 3,358,010, 3,903,126, 3,903,127 or 3,976,622 and which consist of mixtures of N,N', N"-tris-(6-isocyanatohexyl)-biuret with lesser amounts of its higher homologues, as well as the cyclic trimerisates of hexamethylene diisocyanate fulfilling the aforesaid criteria such as may be attained according to U.S. Pat. No. 4,324,879 and which consist essentially of N,N',N"-tris-(6-isocyanatohexyl)-isocyanurate mixed with lesser amounts of its higher homologues. Particularly preferred are mixtures, fulfilling the aforesaid criteria, of hexamethylene diisocyanate-based polyisocyanates possessing uretdione and/or isocyanurate groups, such as arise through catalytic oligomerisation of hexamethylene diisocyanate in the presence of trialkyl phosphines. The aforesaid mixtures with a viscosity at 23° C. of from 50 to 500 mPa.s and an NCO-functionality of between 2.2 and 5.0 are particularly preferred.

Among the likewise suitable but less preferred aromatic polyisocyanates according to the present invention in particular are the "lacquer polyisocyanates" based on 2,4-diiocyanatotoluene or technical mixtures thereof with 2,6-diisocyanatotoluene, or based on 4,4'-diisocyanato-diphenylmethane or mixtures thereof with its isomers and/or higher homologues. Examples of such aromatic lacquer polyisocyanates are the isocyanates possessing urethane groups such as are obtained by the reaction of excess quantities of 2,4-diisocyanatotoluene with polyvalent alcohols such as trimethylolpropane and subsequent removal by distillation of the unreacted excess diioscyanate. Further aromatic lacquer polyisocyanates are, for example, the trimerisates of the monomeric diisocyanates given by way of example, i.e. the corresponding isocyanato-isocyanurates, which are likewise liberated preferably by distillation of excess monomeric diisocyanates subsequent to their preparation.

In principle the use of unmodified polyisocyanates of the kind given by way of example is, of course, also possible provided these are in accordance with the given specifications as regards viscosity.

The use of hydrophilically modified polyisocyanates as component b) or as part of component b) is in principle possible but in general unnecessary owing to the emulsifying action of the components a1) and a2). Polyisocyanates can thus be rendered hydrophilic by, for example, reacting one part of the isocyanate groups with monovalent polyether alcohols possessing ethylene oxide units, for example, the ethoxylation products of simple alkanols with 5 to 100 ethylene oxide units per molecule. An ionic modification of the polyisocyanate components by, for example, reaction with restricted quantities of dimethylolpropionic acid and subsequent neutralization of the resulting reaction product is in principle possible but in general unnecessary.

The auxiliary substances and additives usual in lacquer and varnish technology may be present in the coating agents according to the present invention in addition to the components a1), a2) and b). Examples which may be given are pigments, antifoaming agents, levelling agents, dispersants for pigment distribution, desiccants, fillers, catalysts for the isocyanate addition reaction, antifoaming agents or solubilising agents not incorporated into the film. In general 20 to 50% water, related to the total weight, and 0 to 40% of inert thinner, related to the weight of components a1) and b), is present in the ready-to-use coating agents.

To prepare the ready-to-use coating agent, the polyisocyanate component b) is emulsified in the aqueous solution or dispersion of component a1), wherein component a2) may be stirred into the system prior to or following the addition of the polyisocyanate component b). Mixing may take place by ordinary stirring at room temperature. In this connection the quantity of polyisocyanate b) is calculated so as to result in an equivalent proportion of isocyanate groups of component b) to groups of components a1) and a2) capable of reacting with isocyanate groups of from 0.5:1 to 5:1, preferably 0.8:1 to 2:1. If necessary the required final viscosity may be adjusted by further addition of solvent and/or water within the aforesaid limits.

The optionally used auxiliary substances and additives are incorporated in the system by stirring preferably prior to the addition of the polyisocyanate component b).

The present invention provides for the first time aqueous polyurethane lacquer systems with reactive solvents i.e. with reactive diluents which are incorporated into the coatings by film cross-linking. Besides the particular ecological aspects of these new lacquer systems and the technical advantages of a more favourable processing viscosity and better flow properties, the person skilled in the art may in addition influence the properties of the lacquers as desired through the selection of the reactive diluents. Thus coatings that are brittle per se may be made more elastic by the elasticising action of the reactive diluents. It is known to the lacquer expert that, for example, long-chained diols have an elasticising action.

On the other hand, in a binding agent system with relatively low cross-linking density harder and more resistant coatings may be created through trifunctional or polyfunctional reactive diluents.

The hardening of the coatings may take place at room temperature or under normal baking conditions. Moreover the incorporation of the reactive diluents is dependent on the reactivity of the polyisocyanates and/or the catalysis on one side and on the selected hardening conditions on the other. Thus volatile reactive diluents are to be preferred mainly for hardening at room temperature or for a slightly elevated hardening temperature. At higher baking temperatures and long cross-linking times the use of less volatile reactive diluents is recommended.

The aqueous binding agent systems according to the present invention are suitable for the coating of any substrates, in particular for preparing air-drying or heat-drying coatings on wood, concrete, masonry or metallic substrates.

The following examples refer to data in "%" and "parts" by weight.

EXAMPLE 1

1127.9 parts of propanediol-1,2, 755.9 parts of tri-methylolpropane, 746.2 parts of adipic acid and 1828.5 parts of phthalic anhydride are esterified at 230° C. in a nitrogen atmosphere until an acid number of 7.9 and a viscosity of 143 sec (measured for a 60% by weight solution in dimethylformamide in accordance with DIN 53211) are attained. Esterification is carried out using a column in order to avoid excessive loss of propanediol. Moreover, the temperature is raised from 140 to 230° C. in steps of 10° C./h. The characteristic data given above are attained after a further reaction time of 3.5 hours at 230° C.

309.5 parts of tetratrahydrophthalic anhydride are added to 3309.7 parts of this resin melted at 130° C. The reaction mixture is maintained at 130° C. until the resin has an acid number of 39. The viscosity, 60% by weight in dimethylformamide measured in accordance with DIN 53211, is 182 sec.

The resin obtained is mixed with ε-caprolactam in the proportion of 80 parts of resin to 20 parts of ε-caprolactam. The solution obtained is then dissolved in butoxyethanol to form a 90% by weight solution. Following complete neutralization with N,N-dimethylethanolamine of the carboxyl groups contained in the resin, water is added so as to produce a solution with the following composition:

52.0% by weight of resin 13.0% by weight of ε-caprolactam 2.3% by weight of N,N-dimethylethanolamine 7.2% by weight of n-butoxyethanol 25.5% by weight of water Viscosity (21.5° C.): 27900 mPa.s

EXAMPLE 2

2960.0 parts of linseed oil, 680.0 parts of pentaerythritol and 250.0 parts of trimethylolpropane are heated to 200° C. over a period of one hour in a nitrogen atmosphere. The temperature is then raised to 260° C. over a further hour. The reaction mixture is concentrated at 260° C. until the viscosity of a 70% by weight solution of the concentrated product in xylene, measured in accordance with DIN 53211, is 25 sec.

To 2133.0 parts of the concentration product are added 390.6 parts of trimethylolpropane, 355.7 parts of benzoic acid, 862.9 parts of phthalic anhydride and 213.8 parts of ®Albertol 626C.—a product of Hoechst AG—and the mixture is heated to 140° C. in a nitrogen atmosphere. Condensation is effected in a stream of 3 l of nitrogen per hour, with the temperature being raised by 10° C. per hour to a final temperature of 250° C. At 250° C. the mixture is condensed until an acid number of 3.4 and a viscosity of 25 sec (measured for a 70% by weight solution in dimethylformamide in accordance with DIN 53211) are attained.

3143.3 parts of the condensation product obtained are then reacted at 70° C. with 98.1 parts of an isomeric mixture of 65% of 2,4-diisocyanatotoluene and 35% of 2,6-diisocyanatotoluene. After stirring for 30 minutes the temperature is raised to 120° C. and the reaction maintained at this temperature until a viscosity of 78 sec is attained (50% by weight in dimethylformamide, measured in accordance with DIN 53211). Other characteristic data shown by the resin are:

NCO-content: 0.2% by weight acid number: 3.2 mg KOH/g resin

In the final stage, 2723.0 parts of the resin obtained following urethanisation are reacted at 130° C. with 359.4 parts of tetrahydrophthalic anhydride. The reaction is monitored by measuring the acid number. After stirring for 2.5 hours at 130° C., the resin has the following characteristic data:

viscosity of a 50% by weight solution in dimethylformamide
in accordance with DIN 53211 = 46 sec acid number = 42.3 mg KOH/g resin The resin obtained is mixed with hexanediol-1,6 in the proportion 70 parts of resin to 30 parts of hexanediol. The solution obtained is dissolved in butoxyethanol to form a 90% by weight solution; the free carboxyl groups contained in the resin are completely (100%) neutralized with N,N-dimethylethanolamine and then water is added so as to produce a solution with the following composition:

45.5% by weight of resin 19.5% by weight of hexanediol-1,6

3.1% by weight of N,N-dimethylethanolamine 7.2% by weight of n-butoxyethanol 24.7% by weight of water Viscosity (23° C.): 47500 mPa.s

EXAMPLE 3

699.7 parts of butoxyethanol are placed in a 6 l stirring apparatus fitted with stirrer, thermometer, reflux condenser and metering pump, in a stream of 3 l of nitrogen per hour, and heated to 110° C. Maintaining the temperature at 110° C., a monomer mixture consisting of 167.9 parts of acrylic acid, 828.0 parts of hydroxypropyl methacrylate (addition product of 1 mole of propylene oxide to 1 mole of methacrylic acid), 80.8 parts of styrene, 466.5 parts of methyl methacrylate, 44.3 parts of azobisisobutyronitrile and 16.3 parts of dodecanethiol is pumped in continuously over a 2.5 hour period by means of the metering pump. The reaction mixture is maintained at 110° C. until the monomers are as far as possible completely incorporated into the copolymer. This is monitored by determining the residue of a sample of the polymer solution applied in a thin layer which then remains for 1 hour at 120° C. in a drying cupboard. During this time the volatile organic compounds escape. The polymer is left behind and the polymer content of the solution is found by weighing this polymer residue and relating it to the originally weighed quantity. After further reaction for 4.5 hours, the following characteristic data were measured:

polymer content=78.8% by weight viscosity of a 40% by weight solution in butoxyethanol in accordance with DIN 53211=150 sec acid number=44.4 mg KOH/g polymer The solution prepared in this manner is then reacted with 15% of hexanediol-1,6 related to the total mixture. After the hexanediol has been completely dissolved, the solution is neutralized with N,N-dimethylethanolamine to the extent of 60%, related to the acid number of the copolymer, and then diluted with water so that the sum of copolymer and reactive diluent is approximately 65%. The exact composition is given below.

55.6% by weight of copolymer 9.8% by weight of hexanediol-1,6

2.4% by weight of N,N-dimethylethanolamine 14.9% by weight of n-butoxyethanol 17.3% by weight of water Viscosity (23° C.): 18800 mPa.s

EXAMPLE 4

5.6 parts of castor oil, 609.0 parts of trimethylolpropane, 508.0 parts of pentaerythritol, 492.8 parts of benzoic acid and 1194.7 parts of phthalic anhydride in a stirring apparatus fitted with distillation bridge, thermometer and gas-inlet tube are heated to 140° C. in a stream of 3 l of nitrogen per hour. The temperature is then raised to 260° C. over a period of 12 hours (10° C./h) in a stream of 3 l nitrogen per hour. The condensation is concluded when the viscosity of a 50% by weight solution measured in accordance with DIN 53211 rises again after initial falling.

With the polycondensation carried out in this manner, the resin obtained has the following characteristic data:

viscosity (50% by weight solution in xylene measured in accordance with DIN 532111)=40 sec acid number=5.9 mg KOH/g resin 5.0 parts of the resin thus obtained are then reacted with 329.7 parts of tetrahydrophthalic anhydride at 150° C.

After reaction for 2 hours at 150° C. the following characteristic data are measured:

viscosity (50% by weight solution in xylene measured in accordance with DIN 532111)=93 sec acid number=43.2 mg KOH/g resin The resin is mixed with ε-caprolactam in the proportion 70 parts of resin to 30 parts of reactive diluent, neutralized with N,N-dimethylethanolamine and then diluted with butoxyethanol and water.

Composition:

45.5% by weight of resin 19.5% by weight of ε-caprolactam 2.5% by weight of N,N-dimethylethanolamine 6.5% by weight of n-butoxyethanol 26.0% by weight of water Tests on transparent lacquer The following lacquer polyisocyanates are used in the examples of applications described subsequently:

Lacquer polyisocyanate 1

Biuret polyisocyanate based on 1,6-diisocyanatohexane with an NCO-content of 22.0% and a viscosity (23° C.) of 10,000 mPa.s.

Lacquer polyisocyanate 2

Lacquer polyisocyanate containing isocyanurate groups based on 1,6-diisocyanatohexane with an NCO-content of 21.5% and a viscosity (23° C.) of 3000 mPa.s.

The solutions described in examples 1 to 4 are mixed with lacquer polyisocyanate 1 or lacquer polyisocyanate 2 as cross-linking agents in quantities such that correspond to an NCO/OH equivalent proportion of 1.5:1. If necessary solubilising agents (acetone or diethylene glycol dimethyl ether) and further water are added subsequently so as to adjust the mixture to a viscosity for processing of 50 sec, measured in a drainage cup in accordance with DIN 532111.

These transparent varnishes are then applied by means of a dumbbell shaped spreader in a wet film thickness of 180 μm onto glass plates and hardened at 80 or 120° C. for 30 min. Details and test results are shown in Tables 1 and 2.

groups and chemically bonded carboxylate and/or sulphonate groups and a2) 5 to 70% by weight, based on the weight of component a1), of at least one water-soluble reactive diluent that either is not distillable at normal pressure or has a boiling point of at least 150° C., has a number average molecular weight of less than 300 and has at least one isocyanate-reactive group, and b) a polyisocyanate component which has a viscosity at 23° C. of 50 to 10,000 mPa.s and is present as an emulsion in the aqueous solution and/or dispersion of polyol component a), provided that when component a1) is a urethane-modified polyester resin, said polyisocyanate component is a polyisocyanate which has not been hydrophilically modified, wherein components a) and b) are present in amounts which correspond to an equivalent ratio of isocyanate groups of component b) to isocyanate-reactive groups of component a) of 0.5:1 to 5:1.

TABLE 1

Compositions of transparent lacquers (data on quantities in parts by weight)

| Transparent lacquer | Aqueous resin solution | Quantity | Cross-linking agent | Quantity | Solubilising agent | Quantity | Water |
| --- | --- | --- | --- | --- | --- | --- | --- |
| 1 | Example 1 | 20 | Lacquer polyisocyanate 1 | 14.5 | Acetone | 4.8 | — |
| 2 | Example 2 | " | Lacquer polyioscyanate 1 | 23.5 | Diglyme[1] | 7.9 | 8.9 |
| 3 | Example 3 | " | Lacquer polyisocyanate 2 | 24.1 | — | — | 4.9 |
| 4 | Example 3 | " | Lacquer polyisocyanate 1 | 16.1 | Diglyme[1] | 5.4 | — |
| 5 | Example 4 | " | Lacquer polyisocyanate 1 | 13.7 | " | 4.6 | 6.6 |

[1] Diethylene glycol dimethyl ether

TABLE 2

Tests on transparent lacquers

| Transparent lacquer | Hardening temperature °C. | Optical effect of film | Hardness | Resistance to acetone |
| --- | --- | --- | --- | --- |
| 1 | 80 | transparent, satisfactory flow | almost nailable | yes |
| 1 | 120 | transparent, good flow | nailable | " |
| 2 | 80 | transparent, glossy, very good flow | " | " |
| 2 | 120 | transparent, glossy, very good flow | " | " |
| 3 | 80 | transparent, glossy, very good flow | " | " |
| 3 | 120 | transparent, glossy, very good flow | " | " |
| 4 | 80 | transparent, glossy, very good flow | " | " |
| 4 | 120 | transparent, glossy, very good flow | " | " |
| 5 | 80 | transparent, good flow | " | " |
| 5 | 120 | transparent, good flow | " | " |

We claim:

1. An aqueous two-component coating composition containing a binder which consists essentially of a) a polyol component which is dissolved and/or dispersed in water and consists essentially of a1) at least one water-dilutable polyacrylic resin or polyester resin having a number average molecular weight of greater than 500 and containing hydroxyl 2. The coating composition of claim 1 wherein component a2) is selected from polyvalent alcohols having a molecular weight of 62 to less than 300 that optionally contain ether groups and/or ester groups.

3. The coating compositions of claim 1 wherein component a1) consists essentially of a hydroxy-functional polyacrylic resin having a hydroxyl number of 15 to 200 mg KOH/g, an acid number of 5 to 250 mg KOH/g and a content of chemically incorporated carboxylate and/or sulphonate groups of 8 to 450 milliequivalents per 100 g of solids.

4. The coating composition of claim 3 wherein component a2) is selected from polyvalent alcohols having a molecular weight of 62 to less than 300 that optionally contain ether groups and/or ester groups.

5. A process for preparing a coating composition which comprises i) emulsifying a polyisocyanate component b) having a viscosity at 23° C. of 50 to 10,000 mPa.s and containing at least one organic polyisocyanate, provided that when component a1) is a urethane-modified polyester resin, said polyisocyanate component is a polyisocyanate which has not been hydrophilically modified, in an aqueous solution or dispersion of a polyol component a) which consists essentially of a1) at least one water-dilutable polyacrylic resin or polyester resin having a number average molecular weight of greater than 500 and containing hydroxyl groups and chemically bonded carboxylate and/or sulphonate groups and a2) 5 to 70% by weight, based on the weight of component a1), of at least one water-soluble reactive diluent that either is not distillable at normal pressure or has a boiling point of at least 150° C., has a number average molecular weight of less than 300 and has at least one isocyanate-reactive group, wherein components a) and b) are present in amounts which correspond to an equivalent ratio of isocyanate groups of component b) to isocyanate-reactive groups of component a) of 0.5:1 to 5:1, and ii) incorporating any optional auxiliaries and additives in component a) before the addition of polyisocyanate component b).

* * * * *